(12) United States Patent
Heinz et al.

(10) Patent No.: US 6,822,827 B1
(45) Date of Patent: Nov. 23, 2004

(54) ERASURE TECHNIQUES FOR MAGNETIC TAPE MEDIA

(75) Inventors: John E. Heinz, Plymouth, MN (US); Curtis B. Hause, St. Paul, MN (US); Helen J. Yoo, Maplewood, MN (US)

(73) Assignee: Imation Corp., Oakdale, MI (US)

( * ) Notice: Subject to any disclaimer, the term of this patent is extended or adjusted under 35 U.S.C. 154(b) by 441 days.

(21) Appl. No.: 09/876,415

(22) Filed: Jun. 7, 2001

(51) Int. Cl.[7] .............................................. G11B 5/325
(52) U.S. Cl. ..................................................... 360/118
(58) Field of Search .......................... 360/118, 66, 119, 360/125, 126, 130.21; 361/143, 159, 167

(56) References Cited

U.S. PATENT DOCUMENTS

| | | | | |
|---|---|---|---|---|
| 2,784,259 A | * | 3/1957 | Camras ...................... 360/118 |
| 3,156,784 A | * | 11/1964 | Kump ......................... 360/66 |
| 3,858,136 A | * | 12/1974 | Jun ............................. 335/284 |
| 4,110,797 A | * | 8/1978 | Hoshino et al. ............. 360/17 |
| 4,135,219 A | | 1/1979 | Yoshizawa et al. |
| 4,146,956 A | * | 4/1979 | Fujiwara .................... 29/603.08 |
| 4,287,540 A | * | 9/1981 | Cheatham et al. ........... 360/18 |
| 4,360,854 A | | 11/1982 | Schergen et al. |
| 4,384,313 A | | 5/1983 | Steingroever et al. |
| 4,893,208 A | * | 1/1990 | McClure ..................... 360/118 |
| 5,053,893 A | | 10/1991 | Hayata et al. |
| 5,078,944 A | * | 1/1992 | Yoshino ..................... 264/254 |
| 5,132,860 A | * | 7/1992 | Von Stein ................... 360/118 |
| 5,179,475 A | * | 1/1993 | McClure ...................... 360/17 |
| 5,272,573 A | | 12/1993 | McClure |
| 5,357,398 A | | 10/1994 | Kamijoh |
| 5,430,580 A | * | 7/1995 | Bigelow et al. .............. 360/17 |
| 5,581,417 A | * | 12/1996 | Bigelow ...................... 360/17 |
| 5,979,774 A | * | 11/1999 | Urushibata .................. 235/493 |

OTHER PUBLICATIONS

Finn Jorgensen, "Magnetic Fields from Heads," The Complete Handbook of Magnetic Recording, p 178, 1988.

* cited by examiner

Primary Examiner—Angel Castro
(74) Attorney, Agent, or Firm—Eric D. Levinson (57) ABSTRACT

Methods and apparatus for erasing magnetic tape are described. The tape to be erased is fed through an erasure unit that includes an array of magnetic elements. The array of magnetic elements includes a first set of magnetic elements and a second set of magnetic elements. The magnetic fields for the respective first and second sets of magnetic elements have opposite polarity, as seen by the tape as it feeds through the erasure unit. The fields seen by the tape as it feeds through the erasure unit decrease in intensity.

21 Claims, 8 Drawing Sheets

ERASURE TECHNIQUES FOR MAGNETIC TAPE MEDIA

TECHNICAL FIELD

The invention relates to magnetic storage media, and in particular, to erasing of magnetic tape media.

BACKGROUND

Magnetic tape media is often used for storage and retrieval of data, and comes in many widths and lengths. Magnetic tape media remains an economical medium for storing large amounts of data. For example, magnetic tape cartridges, or large spools of magnetic tape are used to back up large amounts of data for large computing centers. Magnetic tape cartridges also find application in the backup of data stored on smaller computers such as desktop or laptop computers.

During the lifespan of magnetic tape, it may be necessary or desirable to erase the tape. For example, an erasing process is typically implemented during the fabrication of magnetic tape media. Typically, magnetic tape is erased after being coated, cut and spooled, and then servo tracks are written on the magnetic tape after it has been erased. At this stage, there typically is no data stored on the tape. Nevertheless, it is desirable to perform erasure prior to servo writing to ensure that the servo patterns can be properly written.

In addition, magnetic tape may also be erased later in the lifespan of the magnetic tape. For example, the tape may be erased after being recorded, thus putting the tape into a condition to be re-recorded. In this document, the term "erasure" refers to a process or an apparatus that returns the magnetic tape or a portion thereof to a substantially demagnetized condition, i.e., a condition in which the fields of the individual magnetic particles on the tape substantially cancel out. Often the demagnetized condition is one in which the individual magnetic particles have substantially no ordered magnetization pattern.

Erasure is typically accomplished by subjecting the magnetic tape to a magnetic field of sufficient magnitude to saturate the magnetic particles on the tape. The polarity of the applied field is then reversed and the magnitude of the applied field is reduced by some small amount. The polarity of the applied field is then reversed again and the magnitude is again reduced. The process of reducing the magnitude of the applied field and reversing the polarity of the applied field continues until the magnitude reaches zero, or some finite value which is determined to be sufficiently small as to have no further effect.

One common method of erasing involves subjecting an entire reel of tape to a field which is generated by an alternating electric current. The alternating current produces the reversal of magnetic field, and the decay in field strength is provided either by reducing the magnitude of the applied current or by physically removing the media from the erasing field.

Another method of erasing implements a specially designed recording head driven with alternating current. As the tape passes by the head, it is erased by the alternating field generated by the recording head. In order to leave the media in a demagnetized state, each point of the media is subjected to several reversals of field while passing by the head. The frequency of the erasing field is sufficiently high to produce the required number of reversals. The strength of the field, as seen by the tape, decays as the tape moves away from the head.

These conventional methods of erasing magnetic tape, however, are relatively expensive, requiring specially designed degaussing chambers or recording heads. Moreover, these conventional methods can be unreliable. For example, if the proper polarity and intensity of the alternating magnetic field is not maintained, the magnetic tape may still be magnetized following a conventional erasing process.

SUMMARY

In general, the invention is directed to methods and apparatus for erasing magnetic tape. The tape to be erased is fed through an erasure unit that includes an array of discrete magnetic elements. The array of magnetic elements includes a first set of discrete magnetic elements and a second set of discrete magnetic elements. The magnetic fields for the respective first and second sets of magnetic elements have opposite polarity, as seen by the tape as it feeds through the erasure unit.

The magnetic elements in the first and second sets are positioned to define an alternating configuration. For example, each magnetic element in the first set may be positioned proximate one or more elements in the second set, and likewise, each magnetic element in the second set may be positioned proximate one or more elements in the first set. Thus, as the tape feeds through the erasure unit, it encounters magnetic fields that alternate in polarity. In addition, the strength of the fields, as seen by the tape as it passes through the erasure unit, decrease. For example, either the signal strength of the magnetic elements used, the distance between the tape and the elements, or both can be controlled to ensure that the tape encounters alternating fields that decrease in strength. Exponentially decreasing signal strength is preferred.

The discrete magnetic elements (having opposite polarity) may be separated by polar elements. For example, each magnetic element may reside in a gap between two polar elements. The polar elements may act as magnetic poles between proximate magnetic elements. In addition, the polar elements can be formed to focus the magnetic fields, thereby increasing the field strength seen by the tape as the tape passes by a given gap. In addition, non-magnetic material, such as a urethane may fill the gaps to avoid the collection of debris on the magnetic elements.

The erasure unit according to the invention can provide several advantages over conventional methods for erasure. For example, although the invention is not limited in this respect, the erasure unit can use passive magnetic elements, thus requiring no external power supply and therefore avoiding any electronic malfunction. In addition, the erasure unit can be fabricated at relatively low cost. Moreover, the erasure unit can be incorporated into other manufacturing machines or processes, thereby reducing the amount of time and the costs associated with magnetic tape manufacturing. For example, the erasure unit could be incorporated into a tape coating system, a tape cutting system, or a servo writing system. Finally, the erasure unit can be made removable and/or created to have a bypass tape path. In this manner, a given tape manufacturing device or process that implements the erasure unit can operate with or without erasing the tape.

The details of various embodiments are set forth in the accompanying drawings and the description below. Other features, objects, and advantages of the present invention will be apparent from the description and drawings, and from the claims.

DETAILED DESCRIPTION

Figure 1:
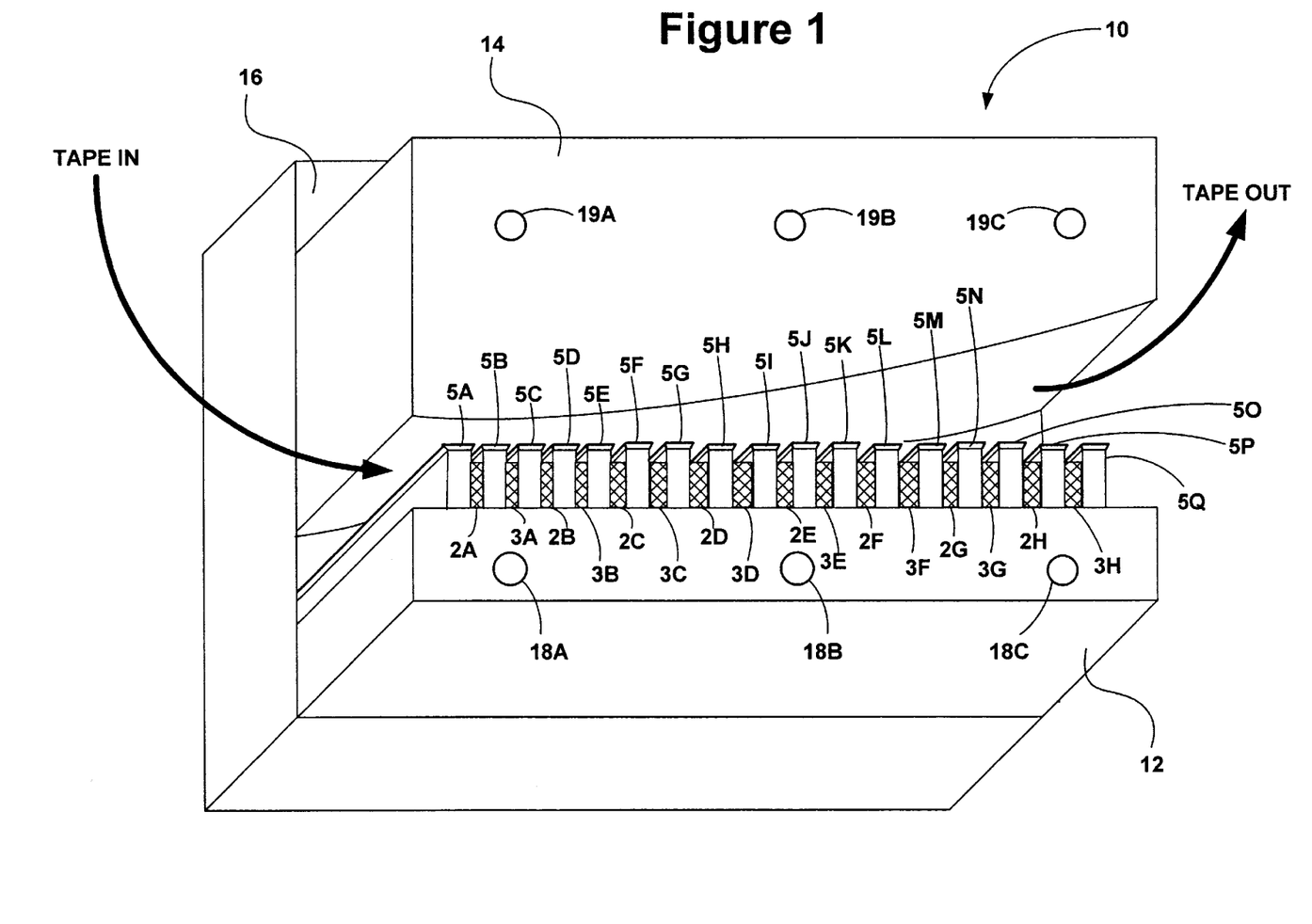
FIG. 1 is a perspective view of an erasure unit according to the invention.

FIG. 1 is a perspective view of an erasure unit 10 according to the invention. Erasure unit 10 includes a plurality of discrete magnetic elements 2A–2H and 3A–3H. Magnetic elements 2A–2H and 3A–3H can be categorized into two sets. Each discrete element in the first set 2A–2H, hereafter 2, produces a magnetic field having a polarity that is opposite that of the discrete elements in the second set 3A–3H, hereafter 3. For example, the magnetic elements 2 and 3 could all be substantially identical, but the magnetic elements in the first set 2 could be oriented differently than the magnetic elements in the second set 3. In this manner, the magnetic elements in the first set 2 can be said to produce a magnetic field having a polarity that is opposite that of the elements in the second set 3.

The magnetic elements in the first and second sets 2, 3 are positioned to define an alternating configuration. For example, each magnetic element in the first set 2 is proximate to at least one magnetic element in the second set 3, and vice versa. For example, element 2A is proximate to element 3A, and element 3A is proximate to element 2B and so forth. Polar elements 5A–5Q, hereafter polar elements 5, may be positioned between the magnetic elements. For example, a polar element 5 may be positioned between proximate magnetic elements 2A and 3A, between 3A and 2B, between 2B and 3B, and so forth. For example, polar elements 5 may be made of steel. In one embodiment, polar elements 5 are made of 1018 cold rolled steel. Other types of polar elements could also be used. The polar elements may be zinc coated to prevent corrosion.

The invention is not limited by the type of magnets used. Any magnet could be used, including electromagnetic magnets. However, passive magnets having relatively strong magnetic fields are preferred because of simplicity and cost advantages. With a passive magnet, there is no need to incorporate electronic circuitry for producing a driving current. For example, NdFeB bonded magnets produce sufficiently strong magnetic fields, and are relatively inexpensive.

In one embodiment, magnetic elements in the first and second sets 2, 3 produce magnetic fields of decreasing intensity. For example, magnetic elements 2A and 3A may produce magnetic fields of opposite polarity but similar intensity. Magnetic elements 2B and 3B may produce magnetic fields of opposite polarity and intensities less than that of magnetic elements 2A and 3A. Similarly, magnetic elements 2C and 3C may produce magnetic fields of opposite polarity and intensities less than that of magnetic elements 2B and 3B, and so forth. Diminishing field intensity can be achieved by selecting magnetic elements having varying sizes, or by selecting magnetic elements made of differing materials.

In another embodiment, the magnetic elements in the first and second sets 2, 3 are substantially identical. For example, the intensities of magnetic fields produced by the elements in the first and second sets may be the same, while the polarity of the field is defined by the orientation of the magnetic elements in the erasure unit 10. In this embodiment, the magnetic elements in the first set 2 may be positioned in a first direction, while the magnetic elements in the second set 3 are positioned in a second direction. The effect of diminishing field intensity can be achieved by varying the distance of the magnetic tape from the magnetic elements as the tape travels through the erasure unit. Magnetic field strength generally decreases as the distance from the source of the field increases. Therefore, by defining a tape path that curves away from the magnetic elements, the magnetic field seen by the tape can be decreased even though the magnetic elements produce substantially equivalent magnetic field intensities. Alternatively, the polar elements 5 can collectively define a magnetic plane that curves away from the tape path.

The first and second sets of magnetic elements 2, 3, along with the set of polar elements 5 can be adhered to a mounting block, e.g., made of metal, to define a erasure block 12. A tape path block 14, may define one or more tape paths. Tape path block 14 and erasure block 12 can be attached or adhered to a servo writing apparatus, a tape cutting apparatus, a tape coating apparatus, or the like. Alternatively, tape path block 14 and erasure block 12 can be attached to a back plate 16, which could be attached or adhered to a servo writing apparatus, a tape cutting apparatus, a tape coating apparatus, or the like. Tape path block 14 and erasure block 12 may be formed with holes 18A–18C and 19A–19C for receiving an attachment device such as a screw, bolt, or the like. Alternatively, tape path block 14 and erasure block 12 could be permanently adhered to back plate 16. Back plate 16 may also be formed with holes (not shown) to facilitate attachment to one or more apparatuses.

Figure 2:
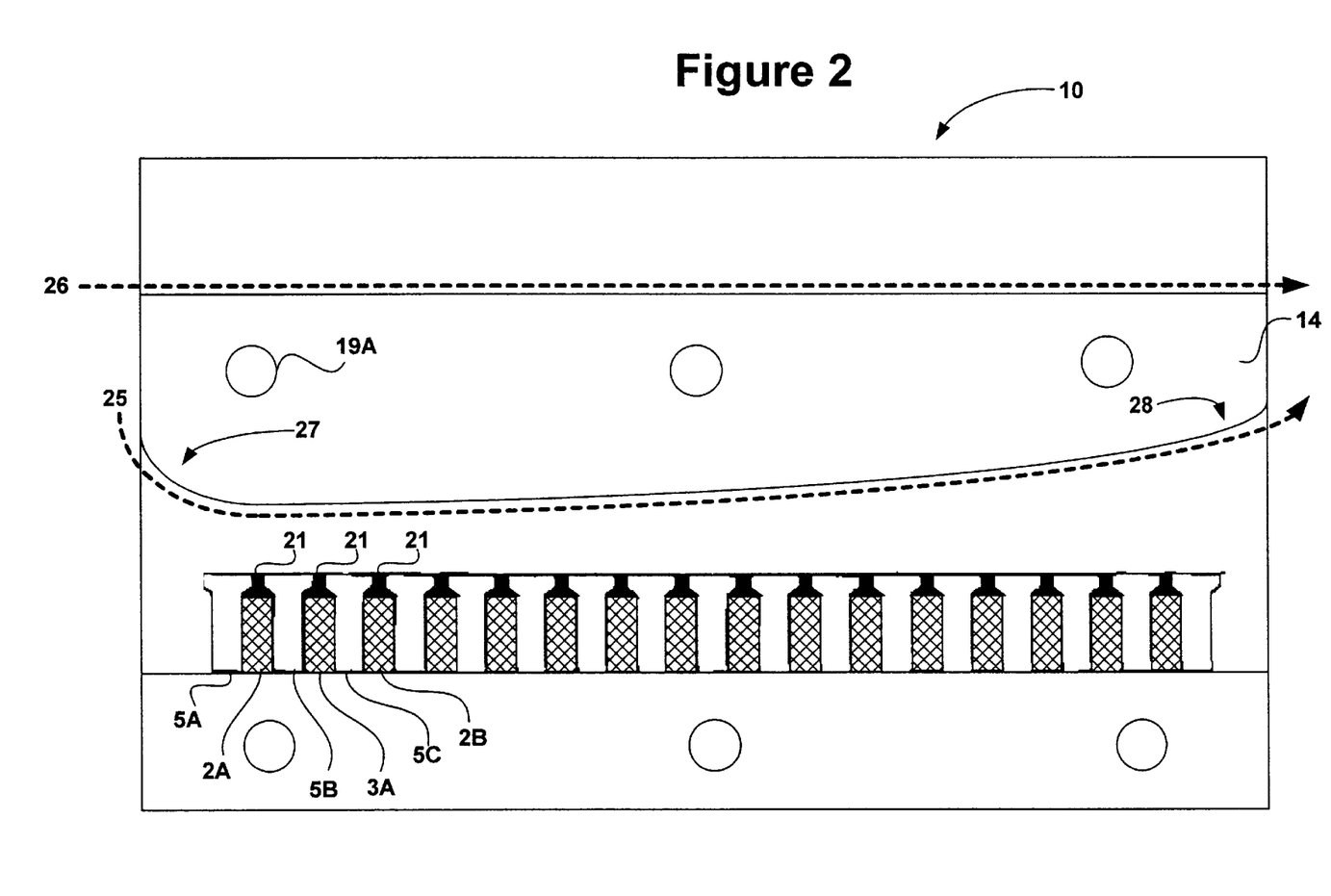
FIG. 2 is a top view of the erasure unit.

FIG. 2 is a top view of the erasure unit 10. As shown, the erasure unit 10 has gaps defined by the location of the individual magnetic elements, e.g., 2A, 3A, 2B, between the polar elements 5. In FIG. 2, the gaps are filled with a non-magnetic material 21. This can ensure that dust or debris cannot collect on the magnetic elements. For example, non-magnetic material 21 may comprise a non-magnetic urethane.

Tape path block 14 may define one or more tape paths through the erasure unit. For example, tape path block may define a first tape path (indicated by dotted line 25), and may also define a second tape path (indicated by dotted line 26). The first tape path 25 causes the tape to pass by the sets of magnetic elements 2, 3, thereby erasing the tape. The second tape path 26, avoids the sets of magnetic elements 2, 3, and thus, does not cause the tape to be erased. Second tape path 26, for example, can be very useful if the erasure unit 10 is implemented as part of another apparatus, such as a servo writing apparatus. If the tape needs to be erased prior to servo writing, the tape can be fed through the first tape path 25. However, if it is desirable not to erase the tape prior to servo writing, the tape can be fed through the second tape path 26, thereby avoiding the sets of magnetic elements 2, 3.

As mentioned above, the erasing process requires the tape to encounter alternating magnetic fields of diminishing intensity. Again, the effect of diminishing intensity can be achieved by using magnets of varying strength, by increasing the distance between the tape and the magnets, or both. The more simple erasure unit 10, however, implements magnets that produce substantially identical field strengths, and decreases the field strength by increasing the distance between the tape and the magnets along the tape path. By defining a tape path that curves away from the magnetic elements, the magnetic field seen by the tape can be decreased even though the magnetic elements produce substantially equivalent magnetic field intensities. Alternatively, the polar elements 5 can collectively define a magnetic plane that curves away from the tape path.

FIG. 2 illustrates an embodiment where tape path block 14 is formed to define a first tape path 25 that curves away from the magnetic elements. The desired strength of the magnetic field, as seen along tape path 25 can be made to decrease substantially exponentially. The effect of substantially exponential decay of field strength can be simplified by presuming that the field from succeeding elements is some percentage, e.g., 90%, of the preceding element. Exponential decay can be achieved as follows.

From the Karlqvist model of a conventional gapped head of gap length g:

$$H_x(x, y) = \frac{H_g}{2\pi}\left(\tan^{-1}\left(\frac{x+\frac{g}{2}}{y}\right) - \tan^{-1}\left(\frac{x-\frac{g}{2}}{y}\right)\right) \quad (1)$$

Where $H_g$ represents the deep gap field.
The maximum value of $H_x$ occurs at x=0:

$$H_x(0, y) = \frac{H_g}{2\pi}\left(\tan^{-1}\left(\frac{\frac{g}{2}}{y}\right) - \tan^{-1}\left(-\frac{\frac{g}{2}}{y}\right)\right) \quad (2)$$

Which simplifies to:

$$H_x(0, y) = \frac{H_g}{\pi}\tan^{-1}\left(\frac{g}{2y}\right) \quad (3)$$

Again, the intent is to produce an exponentially decaying field in succeeding gaps or:

$$H(\chi) = H_0 e^{-\alpha\chi} \quad (4)$$

$$H_x(0, y) = \frac{H_g}{\pi}\tan^{-1}\left(\frac{g}{2y(\chi)}\right) \quad (5)$$

$$H_0 e^{-\alpha\chi} = \frac{H_g}{\pi}\tan^{-1}\left(\frac{g}{2y(\chi)}\right) \quad (6)$$

$$\left(H_0 < \frac{H_g}{2}\right) \quad (6)$$

$$\frac{\pi H_0 e^{-\alpha\chi}}{H_g} = \tan^{-1}\left(\frac{g}{2y(\chi)}\right) \quad (7)$$

$$\tan\left(\frac{\pi H_0 e^{-\alpha\chi}}{H_g}\right) = \frac{g}{2y(\chi)} \quad (8)$$

Where $H_0$ represents the magnitude of the field of the first element, e.g., element 2A, as seen along tape path 25 (FIG. 2). Typically the value of $H_0$ will be several times the coercivity of the media ($H_c$) being erased.

$$y(\chi) = \frac{g}{2\tan\left(\frac{\pi H_0 e^{-\alpha\chi}}{H_g}\right)} \quad (9)$$

Now assign values to the arbitrary constants ($\alpha$ and $H_0$).

$$\text{Define:} \frac{H_0}{H_g} \equiv \beta, \left(0 < \beta < \frac{1}{2}\right) \quad (10)$$

Let X represent the lateral position of the final gap.

$$\frac{H(X)}{H(0)} \equiv \gamma \quad (11)$$

From equation (4):

$$e^{-\alpha X} = \gamma \quad (12)$$

Or:

$$e^{\alpha X} = \frac{1}{\gamma} \quad (13)$$

$$\alpha X = \ln\left(\frac{1}{\gamma}\right) \quad (14)$$

And thus:

$$\alpha = \frac{1}{X}\ln\left(\frac{1}{\gamma}\right) \quad (15)$$

Or:

$$\alpha = \ln\left(\left(\frac{1}{\gamma}\right)^{\frac{1}{X}}\right) \quad (16)$$

Substituting (10) and (16) Into (9) Produces:

$$y(\chi) = \frac{g}{2\tan\left(\pi\beta e^{-\chi\ln\left(\left(\frac{1}{\gamma}\right)^{\frac{1}{X}}\right)}\right)} \quad (17)$$

$$y(\chi) = \frac{g}{2\tan\left(\pi\beta e^{-\ln\left(\left(\frac{1}{\gamma}\right)^{\frac{\chi}{X}}\right)}\right)} \quad (18)$$

$$y(\chi) = \frac{g}{2\tan\left(\pi\beta e^{\ln\left(\gamma^{\frac{\chi}{X}}\right)}\right)} \quad (19)$$

$$y(\chi) = \frac{g}{2\tan\left(\pi\beta\gamma^{\frac{\chi}{X}}\right)} \quad (20)$$

This function can be machined into a tape path block 14 to define the portion of tape path 25 which is used to control the distance of the tape to the magnetic elements.

It is also desirable to define tape path 25 so that magnetic tape will "fly" over the surface as it feeds through erasure unit 10. The tape may have a fly height of approximately 20 microinches. An inlet region (indicated by numeral 27) can be machined adjacent to the exponential curve to promote flyability. In addition, an outlet region could be machined in the region indicated by numeral 28. The inlet and outlet regions may each be defined by an arc of a circle. Larger circle radiuses tend to enhance flyability, but also tend to increase the size of erasure unit 10. 1.25 inch radiuses are sufficiently large to promote flyability along tape path 25 in erasure unit 10 if the tape is moving faster than approximately 2 meters per second and the flyable surface is polished as described below.

As mentioned, the inlet region 27 may be defined by the equation of a circle. At the point defined by the center for the first magnetic element 2A, the tangent of the circle is made equal to the tangent of the exponential curve defined above. The center of the circle may be defined by the center of hole 19A.

For example, given the circle:

$$(x-xc)^2 + (y-yc)^2 = R^2 \qquad (21)$$

where the center of the coordinate system is defined by hole 19A, and the Y-Axis is defined by the center of the first magnetic element 2A, find xc and yc such that the circle is tangent to the function y=f(x) at the point xp,yp.

The slope of f(x) is given by the derivative f'(x).

The circle has a slope given by its derivative $$\frac{dy}{dx} = -\frac{x - xc}{y - yc}$$

The condition of tangency requires that:

$$\frac{dy}{dx} = f'(x) \qquad (22)$$

Thus, $$f'(x) = -\frac{x - xc}{y - yc} \qquad (23)$$

and at the point of tangency, $$f'(xp) = -\frac{xp - xc}{yp - yc}. \qquad (24)$$

Given the relationship:

$$(xp-xc)^2 + (yp-yc)^2 = R^2 \qquad (25)$$

rearrange equation (24):

$$xp-xc = -(yp-yc)f'(xp) \qquad (26)$$

and substitute (26) Into (25):

$$[-(yp - yc)f'(xp)]^2 + (yp - yc)^2 = R^2 \qquad (27)$$

$$(yp - yc)^2(1 + f'(xp)^2) = R^2 \qquad (28)$$

$$(yp - yc)^2 = \frac{R^2}{(1 + f'(xp)^2)} \qquad (29)$$

$$yp - yc = \pm \frac{R}{\sqrt{1 + f'(xp)^2}} \qquad (30)$$

Then:

$$yc = yp \pm \frac{R}{\sqrt{1 + f'(xp)^2}} \qquad (31)$$

Substitute equation (29) into equation (25)

$$(xp - xc)^2 + \frac{R^2}{(1 + f'(xp)^2)} = R^2 \qquad (32)$$

Or:

$$(xp - xc)^2 = R^2\left(1 - \frac{1}{1 + f'(xp)^2}\right) \qquad (33)$$

$$(xp - xc)^2 = R^2\left(\frac{f'(xp)^2}{1 + f'(xp)^2}\right) \qquad (34)$$

$$xp - xc = \pm \frac{Rf'(xp)}{\sqrt{1 + f'(xp)^2}} \qquad (35)$$

$$xc = xp \mp \frac{Rf'(xp)}{\sqrt{1 + f'(xp)^2}} \qquad (36)$$

$$yc = yp \pm \frac{R}{\sqrt{1 + f'(xp)^2}} \qquad (31)$$

$$(x - xc)^2 + (y - yc)^2 = R^2 \qquad (21)$$

$$(y - yc)^2 = R^2 - (x - xc)^2 \qquad (37)$$

$$y - yc = \pm \sqrt{R^2 - (x - xc)^2} \qquad (38)$$

$$y = yc \pm \sqrt{R^2 - (xc)^2} \qquad (39)$$

This function can be machined into a tape path block 14 to define the inlet region 27 of tape path 25.

Defining inlet region 27 with an equation of a circle, the center of which is defined by hole 19A provides advantages in the assembly process of erasure unit 10. During assembly, tape path block 14 can be attached to back plate 16 via an attachment mechanism inserted through hole 19A. Tape path block 14 can then be rotated relative to back plate 16 so that the tape path is optimized for erasure of a particular type of tape media. Once the desired position of tape path block 14 is determined, additional attachment mechanisms can be inserted through other holes on tape path block 14 to ultimately define the position of tape path block 14 relative to the sets of magnetic elements 2, 3.

To further enhance flyability, the surface of the tape path block 14 along tape path 25 can be made with a slightly crowned surface, e.g., on the order of 0.0001–0.001 inch. As the tape flies across the tape path block 14, the edges of the tape may tend to sag. The amount of edge sag generally has a magnitude on the order of the fly height. If the edges drag along the surface of the tape path block 14, wear on the tape path block 14 can cause problems. Thus, by making tape path block 14 to exhibit a slightly crowned surface along tape path 25, the effects of edge sag as the tape flies the tape path block 14 can be minimized.

In one embodiment, the tape path block 14 is made out of a material that is non-magnetic, relatively easy to machine, and wear-resistant (or amendable to having a non-magnetic wear coating applied to it). The material may also exhibit low coefficient of friction relative to the tape, so that the tape can move across the material when it is not flying, e.g., when the movement of the tape starts and stops. A Teflon-impregnated hardcoat-anodized aluminum is an example of a material that satisfies these criteria. In addition, the surface of the material may be highly polished with a surface finish of approximately 4 microinches or less.

Figure 3:
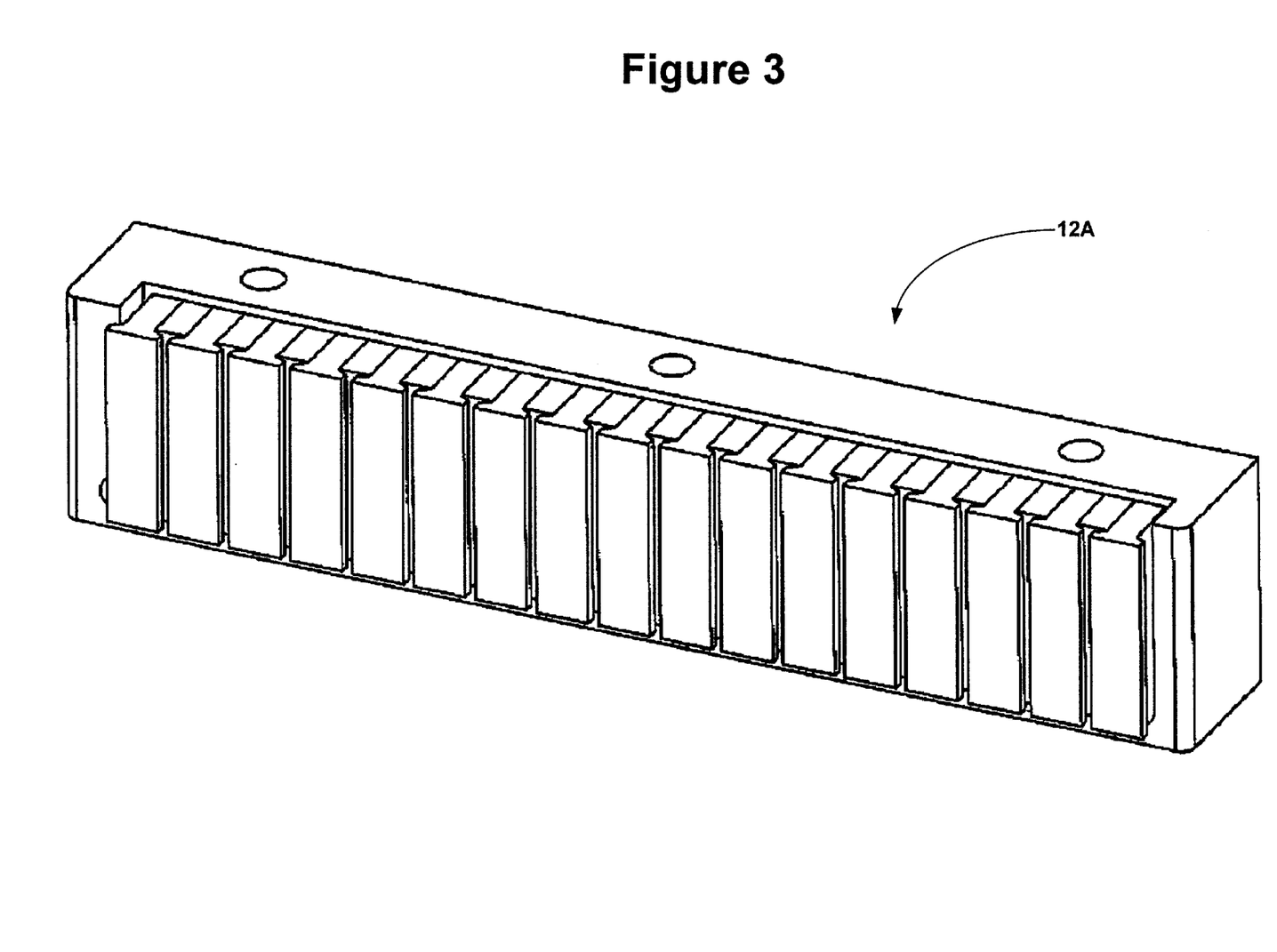
FIG. 3 is a perspective view of a erasure block that can form part of the erasure unit.
Figure 4:
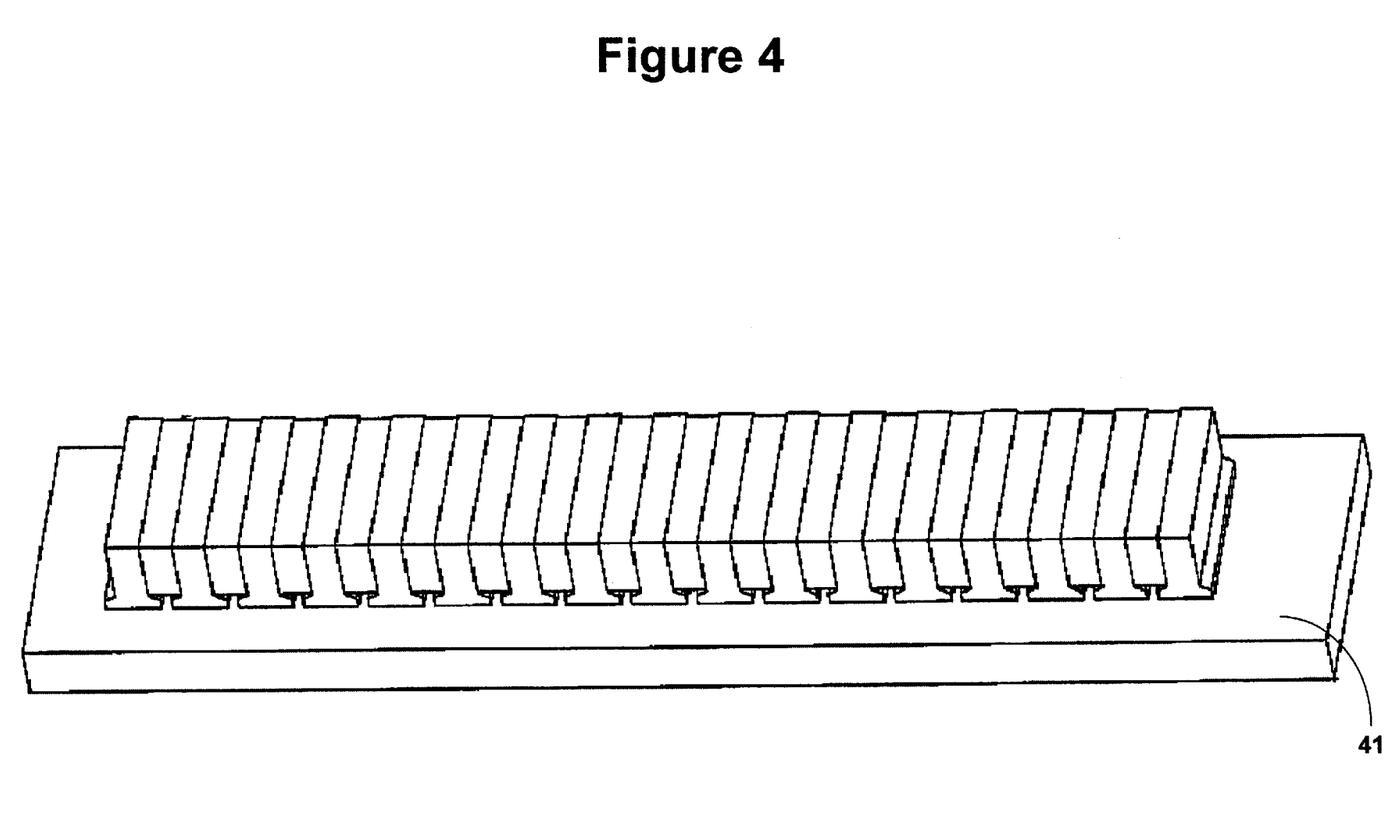
FIGS. 4 and 5 are perspective views collectively illustrating how the erasure block can be fabricated.
Figure 5:
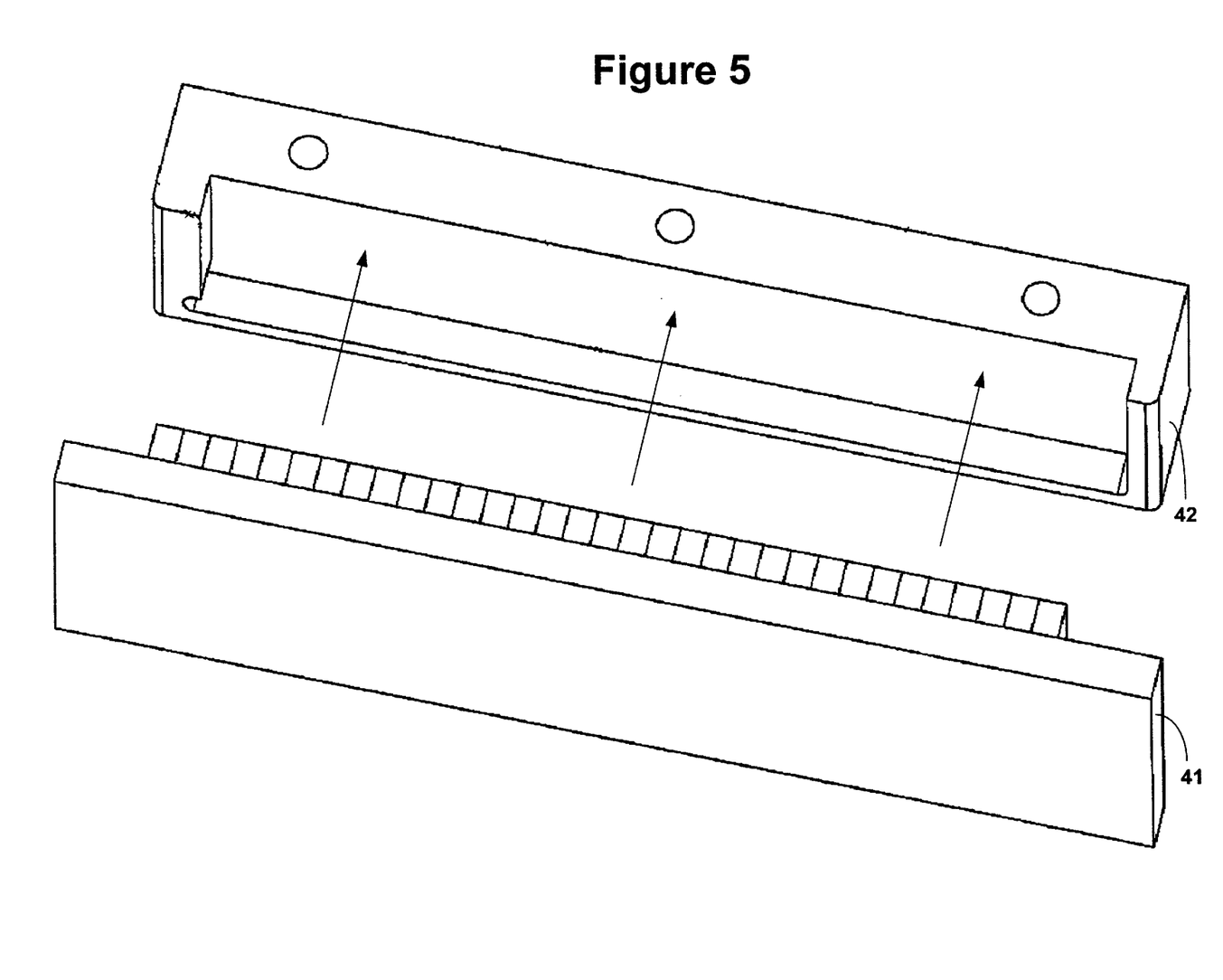

FIG. 3 illustrates an embodiment of erasure block 12A that can form part of erasure unit 10. FIGS. 4 and 5 collectively illustrate how the erasure block 12A can be fabricated. As shown in FIG. 4, the sets of magnetic elements and the polar elements can be aligned along an alignment block 41. For example, if alignment block 41 is made of steel, the sets of magnetic elements and the polar elements will be collectively attracted to the alignment block 41, thereby defining a magnetic plane. As shown in FIG. 5, alignment block 41 can be used to position the magnetic elements and polar elements within mounting block 42 (as indicated by the arrows). For example, mounting block 42 may be comprised of aluminum or another non-magnetic material.

Once the magnetic elements and the polar elements are positioned correctly within mounting block 42, they can be adhered to mounting block 42, and alignment block 41 can be removed. A release agent may be applied to the surface of alignment block 41 to ensure that it can be easily removed after the magnetic elements and the polar elements are adhered to mounting block 42.

Figure 6:
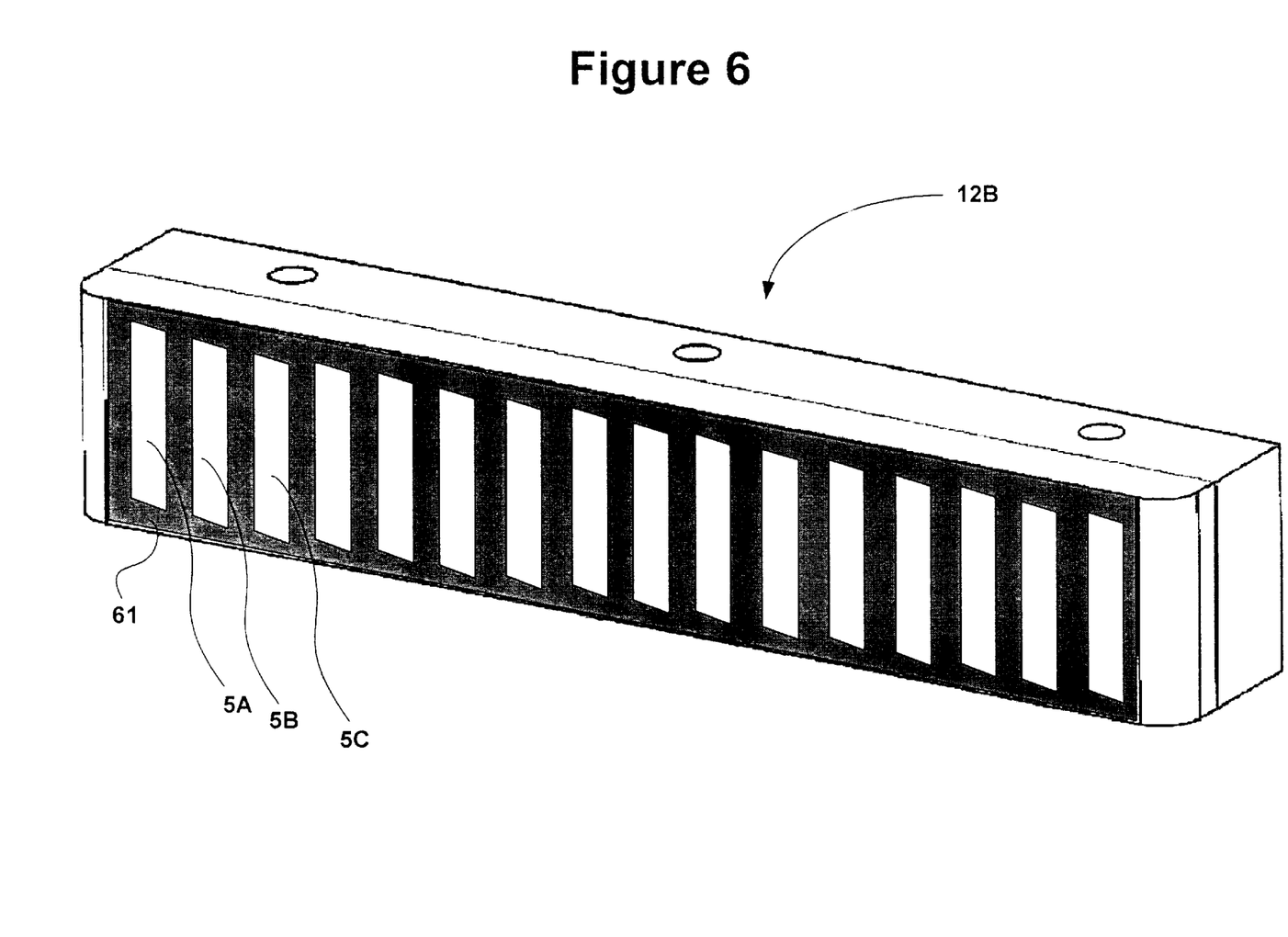
FIG. 6 is another perspective view of a erasure block that can form part of the erasure unit.

In one particular embodiment, a non-magnetic material such as urethane material is used to adhere the magnetic elements and the polar elements to mounting block 42. In that case, the urethane material can be injected,or inserted between the mounting block 42 and the various gaps between the magnetic elements and the polar elements. Once the urethane material has set, the alignment block can be removed. FIG. 6 illustrates an embodiment of erasure block 12B, wherein a non-magnetic urethane material 61 has been used to adhere the magnetic elements (not shown) and the polar elements 5 to mounting block 42. The magnetic plane defined by erasure block 12B may be substantially smooth because urethane material 61 fills the gaps between the various magnetic elements and the polar elements. In other words, erasure block 12B is similar to erasure block 12A (FIG. 3), except that urethane material 61 fills the various gaps so that the magnetic plane of erasure block 12B is substantially smooth. The urethane material 61 also holds the various magnetic elements (not shown) and the polar elements 5 in a fixed position in relation to one another. The urethane material 61, however, does not affect the magnetic properties of the erasure block 12B. A suitable urethane material, for instance, is compound number 6444 available from Ciba-Geigy Chemicals of Switzerland.

The manufacturing process for various types of magnetic tape media typically involves several processes. For example, a wide roll of tape is typically coated with the magnetic material in a coating process. After the coating is dried, the tape may then be cut in a cutting process to realize magnetically coated tape having the desired width. The tape may then be spooled and then erased in a degaussing process. Finally, the tape may be written with servo patterns, and possibly spooled into a tape cartridge or the like. An erasure unit 10 according to the invention could be easily incorporated into one of these manufacturing processes so that a separate degaussing process is avoided. For example, erasure unit 10 could form part of a tape cutting system, a tape spooling system, a tape coating system, or a servo writing system.

Figure 7:
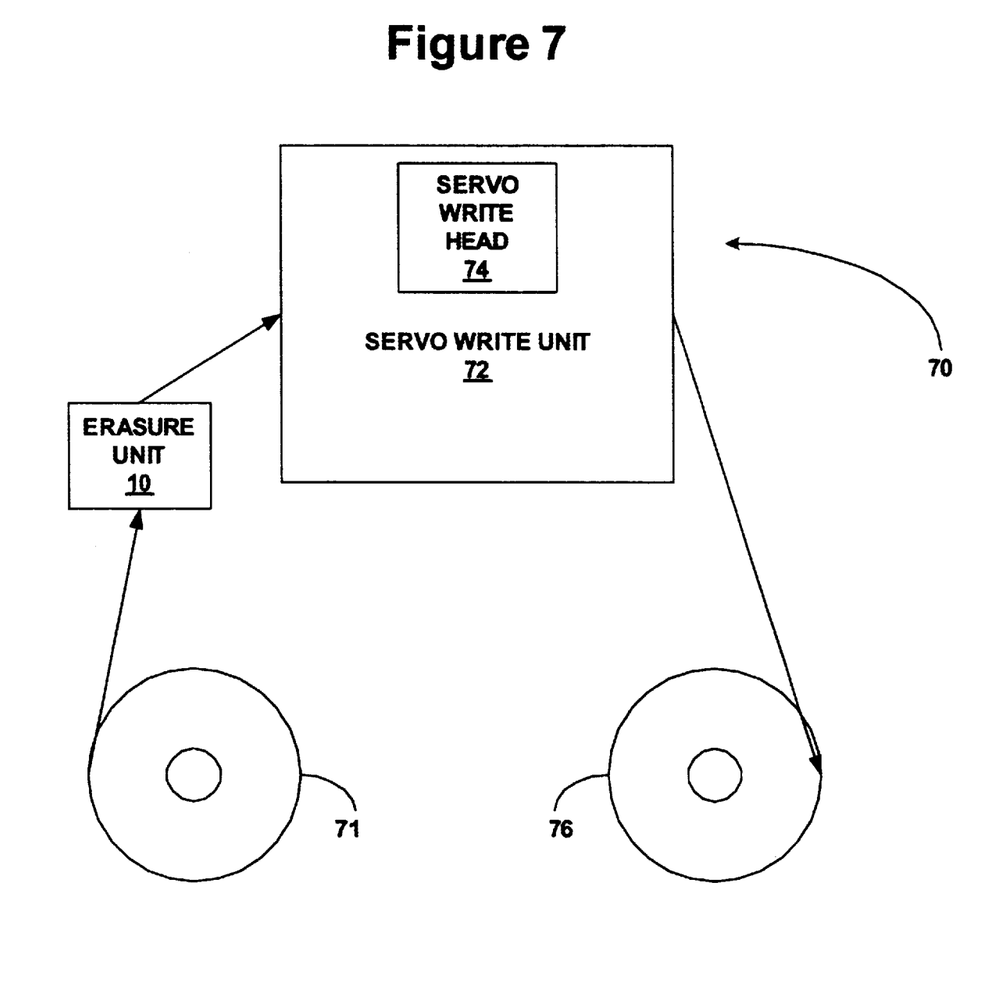
FIG. 7 illustrates a servo writing system that implements the erasure unit.

FIG. 7 illustrates a servo writing system 70 that implements an erasure unit 10, and therefore avoids a separate degaussing process. Servo writing system 70 includes a first spool 71 that includes spooled magnetic tape. The tape feeds out of first spool 71 through erasure unit 10 and into servo writing unit 72. Servo writing unit 72 may implement one or more servo write heads 74 to write servo patterns on the magnetic tape. The tape then feeds out of servo writing unit 74, and is re-spooled onto a second spool 76. Servo writing system 70 may also include various motors (not shown) and guides (not shown) for moving the tape through the system 70, various vacuum units (not shown) to ensure that the tape is taut throughout the system 70, and various cleaning stations (not shown) to wipe the tape clean.

Figure 8:
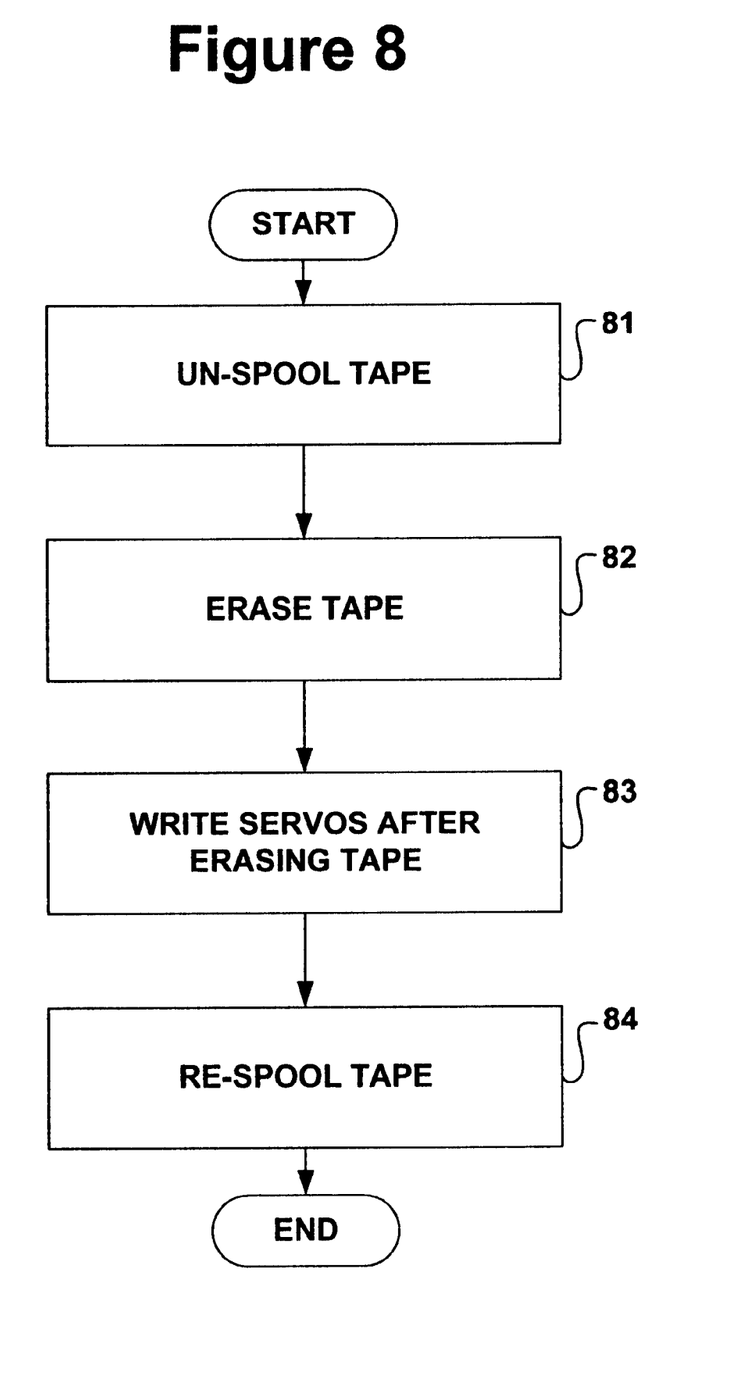
FIG. 8 is a flow diagram illustrating a process according to the invention.

FIG. 8 is a flow diagram illustrating a process of servo writing that implements an erasure unit according to the invention. As shown, magnetic tape is unspooled (81) and then erased with an erasure unit (82). After being erased (82), servo tracks are written on the tape (83). The tape may then be re-spooled (84).

A number of embodiments of the present invention have been described. For example, a relatively simple design of an erasure unit for use with magnetic tape has been described. Nevertheless, various modifications may be made without departing from the scope of the invention. For example, the erasure unit could be implemented much later in the lifetime of the magnetic tape, and could be implemented for use with magnetic tape cartridges or the like. In addition, the erasure unit could use electromagnets rather than passive magnets. In general, the invention may be implemented any time it is desirable to de-magnetize magnetic tape. Accordingly, other embodiments are within the scope of the following claims.

What is claimed is:

1. A magnetic tape erasure unit comprising:
    a first set of magnetic elements,
    a second set of magnetic elements, the magnetic elements in the first and second sets positioned to define an alternating configuration, wherein the magnetic elements in the first and second sets of magnetic elements respectively produce magnetic fields of opposite polarity, and
    a set of polar elements positioned between the magnetic elements,
    wherein the magnetic elements in the first and second sets of magnetic elements produce magnetic fields of substantially equivalent intensities.

2. The erasure unit of claim 1, wherein the sets of magnetic elements define a magnetic plane, the erasure unit further comprising a tape path opposite the magnetic plane.

3. The erasure unit of claim 2, wherein a first side of a block defines the tape path.

4. The erasure unit of claim 3, wherein the tape path is a first tape path, the apparatus further comprising a second tape path that avoids the sets of magnetic elements, wherein a second side of the block defines the second tape path.

5. The erasure unit of claim 2, wherein the magnetic plane defines a curve that bends away from the tape path.

6. The erasure unit of claim 2, wherein the tape path is defined by a curve that bends away from the magnetic plane.

7. The erasure unit of claim 6, wherein the tape path includes an arc-shaped inlet region adjacent the curve.

8. The erasure unit of claim 6, wherein the curve is defined such that magnetic field strength along the curve reduces substantially exponentially.

9. A magnetic tape erasure unit comprising:
    a first set of magnetic elements,
    a second set of magnetic elements, the magnetic elements in the first and second sets positioned to define an alternating configuration, wherein the magnetic elements in the first and second sets of magnetic elements respectively produce magnetic fields of opposite polarity, and
    a set of polar elements positioned between the magnetic elements, wherein the polar elements comprise steel and are zinc coated.

10. The erasure unit of claim 9, wherein the sets of magnetic elements define a magnetic plane, the erasure unit further comprising a tape path opposite the magnetic plane and wherein the tape path defines a curve that bends away from the magnetic plane.

11. A magnetic tape erasure unit comprising:

a first set of magnetic elements, a second set of magnetic elements, the magnetic elements in the first and second sets positioned to define an alternating configuration, wherein the magnetic elements in the first and second sets of magnetic elements respectively produce magnetic fields of opposite polarity, and a set of polar elements positioned between the magnetic elements, wherein the polar elements define magnetic poles, and wherein the erasure unit has gaps defined by the location of the magnetic elements between the polar elements.

12. The erasure unit of claim 11, wherein the sets of magnetic elements define a magnetic plane, the erasure unit further comprising a tape path opposite the magnetic plane and wherein the tape that defines a curve that bends away from the magnetic plane.

13. A magnetic tape erasure unit comprising:

a first set of magnetic elements, a second set of magnetic elements, the magnetic elements in the first and second sets positioned to define an alternating configuration, wherein the magnetic elements in the first and second sets of magnetic elements respectively produce magnetic fields of opposite polarity, and a set of polar elements positioned between the magnetic elements, wherein the polar elements define magnetic poles, and wherein the erasure unit has gaps defined by the location of the magnetic elements between the polar elements, and a non-magnetic material covering the magnetic elements and filling the gaps, wherein the non-magnetic material holds the sets of magnetic elements and the polar elements in a fixed position relative to each other.

14. A servo writing system comprising: a magnetic tape erasure unit positioned along a tape path, the erasure unit including:

a first set of magnetic elements, a second set of magnetic elements, the magnetic elements in the first and second sets positioned to define an alternating configuration, wherein the magnetic elements in the first and second sets of magnetic elements respectively produce magnetic fields of opposite polarity, and a set of polar elements positioned between the magnetic elements, wherein the magnetic elements in the first and second sets of magnetic elements produce magnetic fields of substantially equivalent intensities; and a servo write head positioned along the tape path that writes servo tracks on the tape.

15. The servo writing system of claim 14, wherein the erasure unit includes gaps defined by the location of the magnetic elements between the polar elements.

16. The servo writing system of claim 14, the erasure unit further including a non-magnetic material covering the magnetic elements and filling the gaps, wherein the non-magnetic material holds the sets of magnetic elements and the polar elements in a fixed position relative to each other.

17. The servo writing system of claim 14, wherein the sets of magnetic elements define a magnetic plane, the erasure unit further comprising a block opposite the magnetic plane, the block defining a portion of the tape path.

18. The servo writing system of claim 17, wherein the block defines a curve that bends away from the magnetic plane.

19. A method comprising:

unspooling magnetic tape;

passing the unspooled magnetic tape through an erasure unit to substantially demagnetize the tape;

writing servo patterns on the unspooled and demagnetize tape; and respooling the magnetic tape.

20. The method of claim 19, wherein the unspooled magnetic tape follows a tape path, the tape path:

starting at a first spool, passing through the erasure unit, passing through a servo writing unit after passing through the erasure unit, and ending at a second spool.

21. A magnetic tape erasure unit comprising:

a first set of magnetic elements, a second set of magnetic elements, the magnetic elements in the first and second sets positioned to define an alternating configuration, wherein the magnetic elements in the first and second sets of magnetic elements respectively produce magnetic fields of opposite polarity, a set of polar elements positioned between the magnetic elements, and a block opposite the sets of magnetic elements and the set of polar elements positioned between the magnetic elements, wherein the block defines a curve that bends away from the sets of magnetic elements and the set of polar elements positioned between the magnetic elements.

* * * * *